United States Patent Office 3,288,430
Patented Nov. 29, 1966

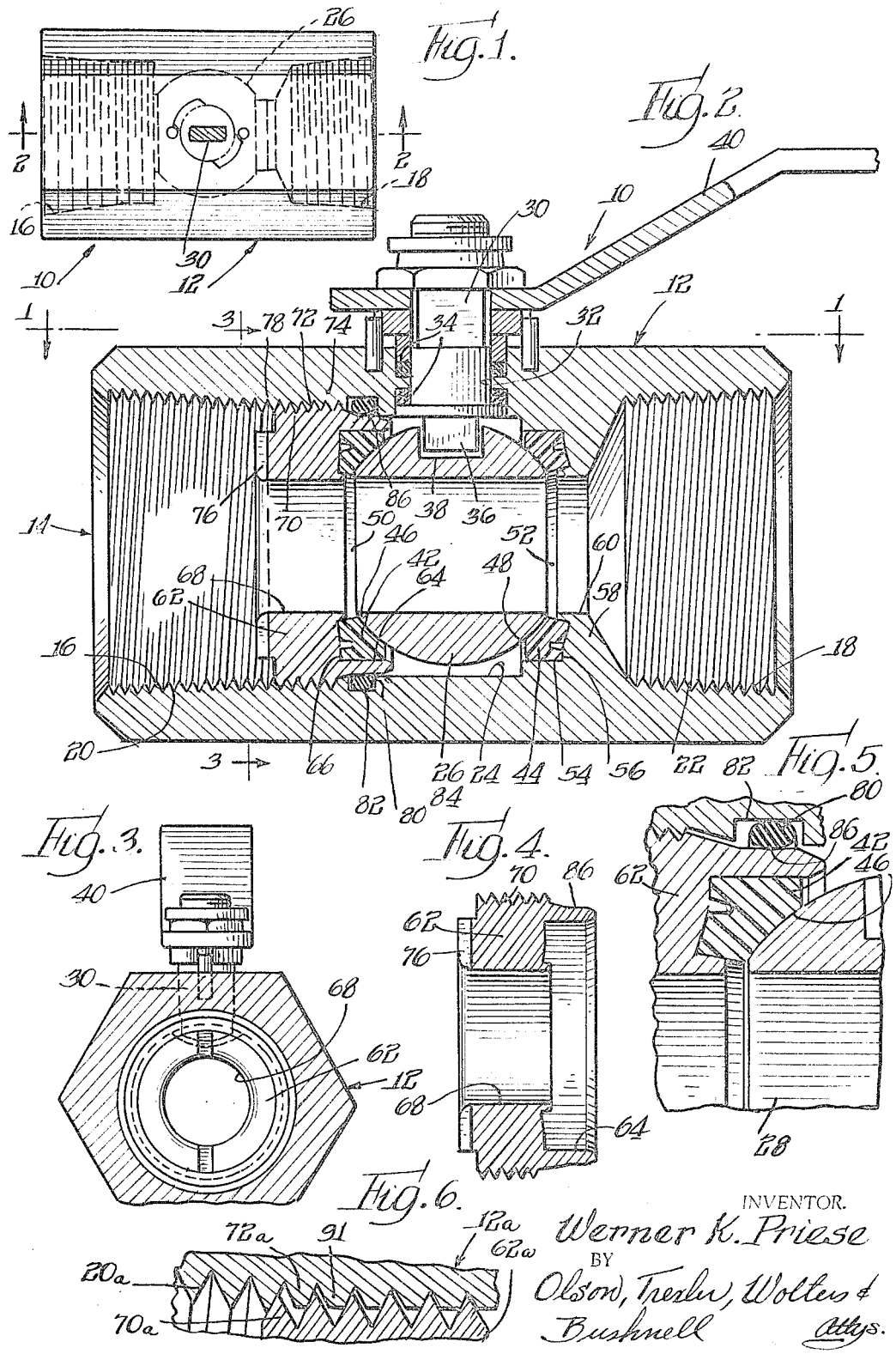

3,288,430
BALL VALVE UNIT
Werner K. Priese, Carpentersville, Ill., assignor to Hills-McCanna Company, Carpentersville, Ill., a corporation of Illinois
Filed May 18, 1964, Ser. No. 368,143
9 Claims. (Cl. 251—315)

The present invention relates to a novel valve structure, more specifically to a novel ball type valve structure.

An important object of the present invention is to provide a novel ball type valve unit which is of simplified construction for facilitating economical manufacture and assembly of parts thereof.

A more specific object of the present invention is to provide a novel ball valve unit having main body means and an adjustable seat adapter mountable within the body means, which unit is constructed for facilitating economical manufacture and assembly of the body means and adapter.

Still another important object of the present invention is to provide a novel ball valve unit of the above described type constructed for enabling the aforementioned ball seat adapter to be adjusted for assuring proper seating of a ball element of the unit and also for insuring the proper fluid tight seal between the adapter member and the main body means.

Other objects and advantages of the present invention will become apparent from the following description and the accompanying drawings wherein:

FIG. 1 is a sectional view of valve unit incorporating features of the present invention taken generally along lines 1—1 in FIG. 2;

FIG. 2 is an enlarged sectional view taken generally along line 2—2 in FIG. 1;

FIG. 3 is a sectional view on a reduced scale taken generally along lines 3—3 in FIG. 2;

FIG. 4 is a sectional view showing a ball seat adapter member incorporated in the valve unit of the present invention;

FIG. 5 is an enlarged fragmentary sectional view showing a portion of the structure in greater detail; and FIG. 6 is a fragmentary sectional view showing a modified form of the present invention.

Referring now more specifically to the drawings wherein like parts are designated by the same numerals throughout the various figures, a valve unit 10 incorporating features of the present invention comprises a main tubular body member 12. Preferably the body member has a non-circular, external cross sectional configuration and in the embodiment shown the body member is provided with a hexagonal configuration for facilitating engagement thereof by means of a tool or wrench during assembly with complementary pipes or fittings, not shown. Of course, different configurations may be used, if desired. The main body member is formed with a central fluid passageway or bore means 14 therethrough partially provided by ports 16 and 18 at opposite ends of the body member. The ports 16 and 18 are respectively defined by tapering pipe threads 20 and 22 for adapting the body member for connection to complementary pipe sections or fittings. As is clearly shown in FIG. 2 the construction is such that the maximum diameter of the pipe threads 20 and 22 is adjacent the outer ends of the body member and the threads progressively decrease in diameter in directions extending toward the center of the body member.

An intermediate portion of the fluid passageway through the main body member is provided by a chamber 24 in which a ball element 26 is disposed. The ball element has a central passageway or bore 28 therethrough. The ball element is adapted to be turned to and from the opened position shown in FIG. 2 selectively for aligning the passageway 28 with the body member passageway 14 and thereby permitting the flow of fluid through the valve and for turning the ball passageway 28 transversely of the body member passageway for interrupting the flow of fluid through the unit.

In order to actuate the ball element 26, a valve stem 30 is rotatably mounted in an aperture 32 of the body member which aperture is sealed by suitable means 34 surrounding the stem. An inner end of the stem is formed with a key portion 36 engageable in a slot 38 in the ball element for causing the ball element to rotate upon the turning of the stem. A suitable handle 40 or other means is connected with an outer end portion of the stem for actuating the valve.

Annual valve seats 42 and 44 are disposed adjacent opposite ends of the ball chamber 24 and present annular concave surfaces 46 and 48 engaging and conforming to the spherical surface of the ball element. The valve seat members 42 and 44 rotatably support the ball element in the chamber 24 and define ports 50 and 52 at opposite ends of the ball chamber having a diameter similar to the diameter of the fluid passageway 28 through the ball element, which diameter is substantially less than the minimum diameter of the pipe threads 20 and 22.

The valve seat member 44 is supported by an annular cylindrical surface 54 formed on the main body member and by a radially inwardly extending surface 56 on an internal flange 58 of the main body member. The flange 58 extends inwardly and defines a port 60 having a diameter similar to the internal diameter of the seat member 44 whereby the flange provides means for supporting the seat member axially in addition to the radial support provided by the cylindrical surface 54.

In order to permit the ball element to be assembled within the chamber 24, the valve seat 42 is removably mounted within the main body member. More specifically, an annular adapter member 62 is provided, which adapter member is formed with a cylindrical seat or surface 64 for radially supporting the seat member 42 and a generally radially extending surface 66 for axially supporting the seat member. The adapter member defines a central opening or port 68 similar in diameter to and aligned with the port 60 at the opposite side of the ball element.

It is important to note that the adapter member 62 is formed with external threads 70 which all are of uniform diameter and which are engageable with complementary threads 72 formed on a uniform diameter portion 74 of the internal wall of the main body member. Since the threads 70 and 72 are straight or, in other words, are of uniform diameter, the adapter member 62 may be freely axially adjusted along the portion 74 of the bore so as to position the valve seat 42 precisely in the desired relationship with respect to the ball element. A slot 76 is provided in an outer end of the adapter member for engagement with a suitable tool which may be used for turning and adjusting the adapter.

In order to facilitate more economical manufacture of the valve unit, the tapered helical threads 20 and the straight helical threads 72 are formed so that they have the same lead, thread contour and so that they merge with each other at an annular area indicated by the numeral 78 and have the same diameter at said area. In other words, except for the fact that the threads 20 are tapered, the threads 20 and 72 are essentially identical and each forms an uninterrupted continuation of the other. This construction permits significant savings in the time required for machining the threads 20 and 72 and in time required for setting up the machine. This construction further simplifies assembly of the adapter member with the main valve body.

In order to prevent leakage of fluid between the main body member and the adapter member, an annular seal or O-ring 80 is disposed against a seat 82 formed in the main body member. The adapter member is formed so as to provide a cylindrical annular surface 86 engageable with the O-ring. With this arrangement, a seal is obtained between the O-ring and the surface 86 while at the same time axial adjustment of the adapter member 62 toward the ball element for positioning the valve seat 42 against the ball element is permitted.

FIG. 6 shows a slightly modified form of the present invention which includes all of the elements of the structure described above and wherein corresponding elements are designated by the same reference numerals with the suffix *a* added. This embodiment differs only in that the thread convolutions 72*a* have tapering roots and crests which are progressively removed sufficiently so that the inner edges or crests of the convolutions 72*a* are of substantially uniform diameter. More specifically, the convolutions 72*a* are initially formed as tapered pipe threads and as continuations of the convolutions 20*a* whereby the same tool or tap may be used for cutting both the convolutions 20*a* and the convolutions 72*a*. After the threads have been formed in this manner the crests of the convolutions 72*a* are progressively removed by a drilling or grinding operation.

The pitch diameter of the machine threads 70*a* on the adapter 62*a* is slightly smaller than the pitch diameter of one of the convolutions 72*a* which is located substantially centrally between opposite ends of the convolutions 72*a* and as indicated by the numeral 91. The adapter member convolutions 70*a* have a running fit with the center convolution 91 and the fit between the adapter threads and the convolutions 72*a* is relatively loose outwardly of the center convolution 91 and progressively tighter inwardly of the center convolution 91. The progressive removal of the crest 89 of the convolution 72*a* prevents these inclined pipe threads from interfering with the adapter member. The thread tolerances are such that the desired axial adjustment of the adapter member may be obtained before the crests of the adapter member threads interfere with the roots of the convolutions 72*a*. This embodiment provides an advantage of being relatively economical to produce but is capable of permitting relatively limited axial adjustment of the adapter as compared with the embodiment described above.

While preferred embodiments of the present invention have been shown as described herein, it is obvious that many structural details may be changed without departing from the spirit and scope of the appended claims.

The invention is claimed as follows:

1. A valve unit comprising a main body means having a fluid passageway therethrough, a valve element shiftably disposed within said body means for selectively opening and closing said passageway, a valve seat member engageable with said valve element, and an annular adapter member within said body means and supporting said valve seat member, said adapter member including a plurality of external thread convolutions of uniform crest diameter and predetermined lead, said body means including a plurality of internal thread convolutions of uniform diameter and having said predetermined lead and being complementary to and cooperatively engaging said adapter member thread convolutions for enabling the adapter member to be axially adjusted, and said body means including a plurality of tapering internal thread convolutions merging at a predetermined area with said first mentioned internal thread convolutions, said tapering convolutions having a lead substantially equal to said predetermined lead and progressively increasing in diameter from said area toward an outer end of said body means.

2. A valve unit comprising a main body member having an axially extending and fluid passageway therethrough, said body member including a plurality of internal tapering pipe thread convolutions defining opposite end portions of said passageway and respectively progressively decreasing in diameter from opposite ends of said main body member toward a central portion of the main body member, a ball valve element rotatably disposed within the central portion of said passageway selectively for opening and closing said passageway, first and second annular valve seat members respectively at opposite sides of and engaging said ball element and being axially aligned with said passageway, first and second means respectively supporting said first and second valve seat members within said body member, said first means comprising an annular adapter member including a plurality of external thread convolutions of uniform diameter, and said main body member including a plurality of internal thread convolutions merging with and providing a continuation of adjacent pipe thread convolutions and being of uniform crest diameter and complementary to and in cooperative engagement with the thread convolutions of the adapter member for enabling the adapter member to be axially adjusted for positioning the valve seat member supported thereby with respect to the ball valve element.

3. A valve unit as defined in claim 2, which includes an annular seal member disposed between said main body member and a portion of said adapter member, said adapter member having a cylindrical surface slidably engaging said seal member and sealingly retaining the seal member between said portion and the main body member while permitting axial adjustment of the adapter member.

4. A valve unit comprising a main body member having a fluid passageway therethrough, a valve element shiftably disposed within said passageway selectively for opening and closing said passageway, annular valve seat means including an annular adapter member associated with said valve element and removably disposed within said passageway, said main body member including a plurality of helical thread convolutions having a predetermined lead, a first portion of said thread convolutions adjacent an end of said body member progressively decreasing in diameter from said end toward the valve element, a second portion of said thread convolutions forming a continuation of said first portion and being of uniform crest diameter, said adapter member including a plurality of external thread convolutions of uniform diameter complementary to and cooperatively engaging said second portion of the first-mentioned thread convolutions for enabling the adapter member to be axially adjusted.

5. A valve unit, as defined in claim 4, wherein said valve seat means comprises an annular valve seat member supported by a radially inwardly facing surface of said adapter member, and said unit including an annular seal member disposed between said body member and said adapter member, having a surface engageable with said seal member for sealingly engaging the seal member during adjustment of the adapter member toward said valve element.

6. A valve unit comprising a main body member, said body member having a central axially extending fluid passageway therethrough, said body member including a plurality of internal tapered pipe thread convolutions extending inwardly from first and second ends thereof, said body member having a generally centrally disposed chamber between said pipe thread convolutions at the first and second ends thereof, a ball valve element rotatably disposed within said chamber selectively for opening and closing said passageway, first and second annular seat members aligned with said passageway at opposite sides of and engaging said ball element, first and second means at opposite sides of said ball element respectively supporting said seat members, one of said means being integral with said body member, the other said means comprising an annular adapter member presenting a radially inwardly facing surface supporting an associated valve seat member, said adapter member including a plurality of external thread convolutions of uniform crest diameter and predetermined lead, and said body member including a plurality of internal thread convolutions of uniform crest diameter merging with and forming a continuation of adjacent pipe thread convolutions and complementary to and cooperatively engaging the adapter member thread convolutions for enabling the adapter member to be axially adjusted for positioning its associated valve seat with respect to the ball element.

7. A valve unit, as defined in claim 6, wherein said adapter member comprises a generally radially outwardly facing annular surface in radial alignment with said inwardly facing surface of the adapter member, said body member including an annular surface spaced from and opposing said outwardly facing surface of the adapter member, and a seal ring sealingly clamped between said last-mentioned surface of the body member and said radially outwardly facing surface of the adapter member.

8. A valve unit, as defined in claim 6, wherein said last-mentioned internal thread convolutions are machine threads having a substantially uniform root diameter.

9. A valve unit as defined in claim 6, wherein last-mentioned internal thread convolutions are pipe thread convolutions having tapered roots.

References Cited by the Examiner

UNITED STATES PATENTS

| | | | |
|---|---|---|---|
| 676,526 | 6/1901 | Anderson | 251—315 X |
| 1,616,386 | 2/1927 | O'Strosice | 251—315 X |
| 3,016,226 | 1/1962 | Freeman | 251—315 X |

FOREIGN PATENTS 761,890  1/1954  Germany.

M. CARY NELSON, *Primary Examiner.*

H. KLINKSIEK, *Assistant Examiner.*